United States Patent
Kim

(10) Patent No.: US 11,847,347 B2
(45) Date of Patent: Dec. 19, 2023

(54) METHOD FOR OPTIMIZING VCRM TRANSMISSION DATA OPTIMIZATION AND APPARATUS THEREFOR

(71) Applicants: HYUNDAI MOTOR COMPANY, Seoul (KR); Kia Corporation, Seoul (KR)

(72) Inventor: Sun Woo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 281 days.

(21) Appl. No.: 17/497,269

(22) Filed: Oct. 8, 2021

(65) Prior Publication Data

US 2022/0197547 A1 Jun. 23, 2022

(30) Foreign Application Priority Data

Dec. 23, 2020 (KR) ........................ 10-2020-0182471

(51) Int. Cl.
*G06F 3/06* (2006.01)

(52) U.S. Cl.
CPC .......... *G06F 3/0656* (2013.01); *G06F 3/0608* (2013.01); *G06F 3/0679* (2013.01)

(58) Field of Classification Search
CPC .... G06F 3/0656; G06F 3/0608; G06F 3/0679; G07C 5/008; G06Q 30/016; H04L 49/9047; H04L 47/31; H04L 49/9005; H04L 2012/40273
See application file for complete search history.

(56) References Cited

U.S. PATENT DOCUMENTS

| | | | |
|---|---|---|---|
| 7,376,768 B1 * | 5/2008 | Macciocca | G06F 9/545 710/24 |
| 9,043,555 B1 * | 5/2015 | Khona | G06F 3/0683 711/170 |
| 9,747,106 B1 * | 8/2017 | Gomes | G06F 9/50 |
| 9,940,035 B1 * | 4/2018 | Lemar | G06F 3/0611 |
| 2016/0179668 A1 * | 6/2016 | Chu | G06F 12/023 711/119 |
| 2019/0294710 A1 * | 9/2019 | Gupta | G06F 16/24534 |
| 2020/0097183 A1 * | 3/2020 | Rawal | G06F 12/0891 |
| 2020/0133882 A1 * | 4/2020 | Song | G06F 3/0679 |
| 2020/0348842 A1 * | 11/2020 | Meadowcroft | G06F 9/45558 |
| 2020/0349022 A1 * | 11/2020 | Meadowcroft | G06F 3/0671 |
| 2020/0349030 A1 * | 11/2020 | Meadowcroft | G06F 11/1471 |
| 2020/0379774 A1 * | 12/2020 | Alperovich | G06F 12/0804 |

FOREIGN PATENT DOCUMENTS

| | | | | |
|---|---|---|---|---|
| CA | 2626083 A1 * | 4/2007 | | H04L 49/90 |
| CA | 2751180 A1 * | 8/2010 | | G06F 11/2064 |

* cited by examiner

*Primary Examiner* — Christopher D Birkhimer
(74) *Attorney, Agent, or Firm* — MORGAN, LEWIS & BOCKIUS LLP

(57) ABSTRACT

The present invention relates to a VCRM data transmission optimizing method and an apparatus therefor, and a method of transmitting VCRM data in a vehicle terminal may include generating at least one data slot buffer, determining whether to perform buffer flush according to whether data is changed, and whether a buffer max size is reached, when new data is entered, and flushing data recorded in a corresponding data slot buffer according to the determination for performing the buffer flush to be transmitted to a server over a wireless network.

20 Claims, 4 Drawing Sheets

METHOD FOR OPTIMIZING VCRM TRANSMISSION DATA OPTIMIZATION AND APPARATUS THEREFOR

CROSS-REFERENCE TO RELATED APPLICATION

The present application claims priority to Korean Patent Application No. 10-2020-0182471, filed on Dec. 23, 2020, the entire contents of which is incorporated herein for all purposes by this reference.

BACKGROUND OF THE INVENTION

Field of the Invention

The present invention relates to a vehicle customer relation management (VCRM) system, and more particularly, relates to a VCRM data transmission technology which is capable of reducing wireless data usage by adaptively controlling data transmission to a server depending on features of data collected by a VCRM terminal.

Description of Related Art

A VCRM system collects data generated inside a vehicle to be transmitted to a server. In the present way, various pieces of useful information such as a driving history and fuel efficiency information of a vehicle may be processed to be provided to customers. Besides, the VCRM system may be used as data for research and development (R&D), such as vehicle performance, quality improvement, or the like by analyzing big data thus collected variously.

The added value capable of being provided or produced through the data collected by the VCRM system increases in proportion to the precision of collected data as well as the amount of collected data.

Wireless data communication needs to be used to transmit data collected inside a vehicle to the server in real time. However, the wireless data communication is not a resource capable of being used free of charge, but a resource that needs to be used for a fee by contracting with each local wireless communication network operator. For a domestic region, the wireless data communication is limited to 50 MB per month.

A conventional VCRM collection terminal automatically transmits the data collected from an electronic control unit (ECU) inside the vehicle to the server without any special processing. In other words, the VCRM collection terminal does not consider content of the collected data. Accordingly, no matter what content is collected in any pattern, the conventional VCRM collection terminal is stored automatically. As the collected data increases, as the data collection resolution increases, the possibility of utilizing the collected data may increase, thereby increasing the demand for data collection. Accordingly, there is a demand for a method for collecting/transmitting data more efficiently within the limited transmission capacity.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for transmitting VCRM data, and an apparatus therefor.

Various aspects of the present invention are directed to providing a VCRM data transmission method configured for reducing wireless data usage by transmitting the number of times that a specific value is repeated, instead of repeatedly transmitting the same value collected every collection cycle when an actual value of data to be collected has static characteristics and an apparatus therefor.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a method of transmitting vehicle customer relation management (VCRM) data in a vehicle terminal may include generating at least one data slot buffer, determining whether to perform buffer flush according to whether data is changed, and whether a buffer max size is reached, when new data is entered, and flushing data recorded in a corresponding data slot buffer according to the determination for performing the buffer flush to be transmitted to a server over a wireless network.

In various exemplary embodiments of the present invention, the method may further include setting a default size and a max size for the at least one data slot buffer. It may be determined that the buffer max size is reached, according to an event that a data slot buffer corresponding to the new data among the at least one data slot buffer is in a full state and a current size of the corresponding data slot buffer reaches the max size.

In various exemplary embodiments of the present invention, the method may further include increasing a size of the corresponding data slot buffer by the default size according to an event that the buffer max size is not reached.

In various exemplary embodiments of the present invention, the method may further include updating a tag field based on an event that the buffer max size is reached. Data to be transmitted to the server may include the tag field to be transmitted.

In various exemplary embodiments of the present invention, the tag field may include at least one of an ID field for uniquely identifying a corresponding data, a repeat counter field indicating the number of times that same data is repeatedly received, a buffer max field indicating whether the corresponding data slot buffer reaches the max buffer size, or a buffer refresh field indicating whether a data value received in the corresponding data slot buffer is changed.

In various exemplary embodiments of the present invention, the method may further include identifying the data slot buffer, in which the new data is recorded, depending on the input of the new data, determining whether the new data is first data of the identified data slot buffer, determining whether to change the data when a result of the determination indicates that the new data is not the first data, and performing the buffer flush based on an event that the data is changed.

In various exemplary embodiments of the present invention, the method may further include decreasing a size of the identified data slot buffer by the default size based on the event that the data is changed, and recording the new data in the identified data slot buffer.

In various exemplary embodiments of the present invention, the default size and the max size may be differently set for each of the at least one data slot buffer.

In various exemplary embodiments of the present invention, it may be determined whether the data is changed, by comparing the new data with data which is most recently recorded in a data slot buffer corresponding to the new data, among the at least one data buffer.

In various exemplary embodiments of the present invention, the new data may be received through a vehicle internal communication network. The vehicle internal communication network may include at least one of a controller area network (CAN), Ethernet, a local interconnect network (LIN), or FlexRay.

According to various aspects of the present invention, an apparatus provided in a vehicle and controlling VCRM data transmission may include a data collector that collects data over a vehicle internal communication network, a buffer controller that generates at least one data slot buffer corresponding to the data and determines whether to perform buffer flush on the at least one data slot buffer according to whether to change the data and whether a buffer max size is reached, when new data is received from the data collector, and a data transmission buffer that flushes data recorded in a corresponding data slot buffer according to the determination for performing the buffer flush to be transmitted to a server over a wireless network.

In various exemplary embodiments of the present invention, the apparatus may further include a device that sets a default size and a max size for the at least one data slot buffer. The buffer controller may be configured to determine that the buffer max size is reached, according to an event that a data slot buffer corresponding to the new data among the at least one data slot buffer is in a full state, and a current size of the corresponding data slot buffer reaches the buffer max size.

In various exemplary embodiments of the present invention, the buffer controller may increase a size of the corresponding data slot buffer by the default size according to an event that the buffer max size is not reached.

In various exemplary embodiments of the present invention, the apparatus may further include a device that updates a tag field based on an event that the buffer max size is reached. Data to be transmitted to the server may include the tag field to be transmitted.

In various exemplary embodiments of the present invention, the tag field may include at least one of an ID field for uniquely identifying a corresponding data, a repeat counter field indicating the number of times that same data is repeatedly received, a buffer max field indicating whether the corresponding data slot buffer reaches the max buffer size, or a buffer refresh field indicating whether a data value received in the corresponding data slot buffer is changed.

In various exemplary embodiments of the present invention, the apparatus may further include a device that identifies the data slot buffer, in which the new data is recorded, depending on the input of the new data, a device that determines whether the new data is first data of the identified data slot buffer, a device that determines whether to change the data when a result of the determination indicates that the new data is not the first data, and a device that performs the buffer flush based on an event that the data is changed.

In various exemplary embodiments of the present invention, the apparatus may further include a device that decreases a size of the identified data slot buffer by the default size based on the event that the data is changed, and a device that records the new data in the identified data slot buffer.

In various exemplary embodiments of the present invention, the default size and the max size may be differently set for each of the at least one data slot buffer.

In various exemplary embodiments of the present invention, the buffer controller may be configured to determine whether the data is changed, by comparing the new data with data which is most recently recorded in a data slot buffer corresponding to the new data, among the at least one data buffer.

In various exemplary embodiments of the present invention, the new data may be received through a vehicle internal communication network. The vehicle internal communication network may include at least one of CAN, Ethernet, LIN, or FlexRay.

The technical problems to be solved by embodiments of the present invention are not limited to the aforementioned problems, and other technical problems that are not mentioned will be clearly understood by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
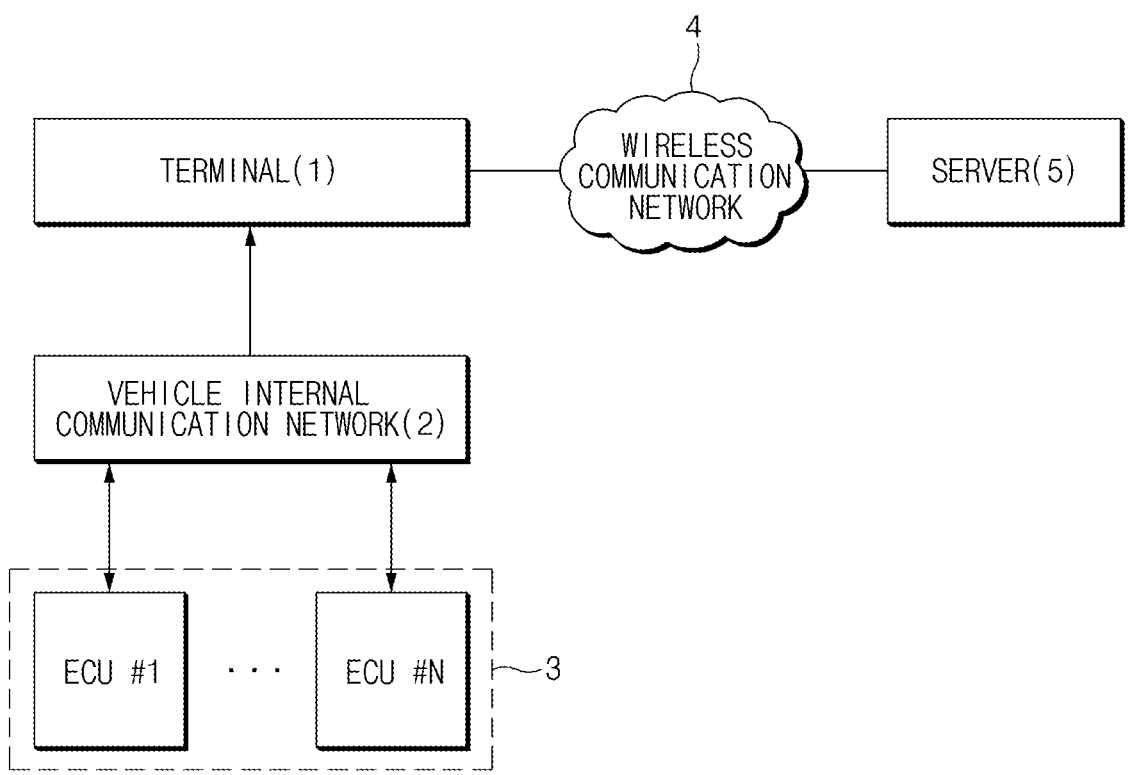
FIG. 1 is a diagram for describing a structure of a VCRM system.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In adding reference numerals to components of each drawing, it may be noted that the same components have the same reference numerals, although they are indicated on another drawing. Furthermore, in describing the exemplary embodiments of the present invention, detailed descriptions associated with well-known functions or configurations will be omitted when they may make subject matters of the present invention unnecessarily obscure.

In describing elements of exemplary embodiments of the present invention, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which various exemplary embodiments of the present invention belongs. It will be understood that terms used herein should be interpreted as having a meaning which is consistent with their meaning in the context of the present invention and the relevant art and will not be interpreted in an idealized or overly formal sense unless expressly so defined herein.

Hereinafter, various embodiments of the present invention will be described in detail with reference to FIG. 1, FIG. 2, FIG. 3, and FIG. 4.

FIG. 1 is a diagram for describing a structure of a VCRM system.

Referring to FIG. 1, a terminal 1 provided in a vehicle may collect various data from various electronic control units (ECUs) 3 connected to a vehicle internal communication network 2. For example, the vehicle internal communication network 2 may include at least one of a controller area network (CAN), an Ethernet network, FlexRay, a local interconnect network (LIN), or a media-oriented system transport (MOST).

The terminal 1 may transmit the collected data to a server 5 through a wireless communication network 4. Herein, the wireless communication network 4 may include at least one of a 4G Long Term Evolution (LTE) network, a 5G New Radio (NR) network, or a Wi-Fi network.

The server 5 may generate useful information such as the driving history and fuel economy driving information of a vehicle based on the data received from the terminal 1 and may provide the information to the corresponding vehicle terminal or customer terminal.

Also, vehicle manufacturers may utilize the useful information as R&D data for vehicle performance/quality improvement through various big data analysis based on the data collected by the server 5.

At the present time, the added value configured for being provided or produced through the collected data may increase in proportion to the precision of the collected data as well as the amount of the collected data.

Various aspects of the present invention provide a method for optimizing VCRM transmission data which is configured for reducing wireless data usage by transmitting the number of times that a specific value is repeated, instead of repeatedly transmitting the same value collected every collection cycle when an actual value of data to be collected has static characteristics.

A large number of data collected from the vehicle has a static characteristic changed only at a specific operating time, and thus the wireless data usage may be significantly reduced through differentiated processing according to data characteristics.

Figure 2:
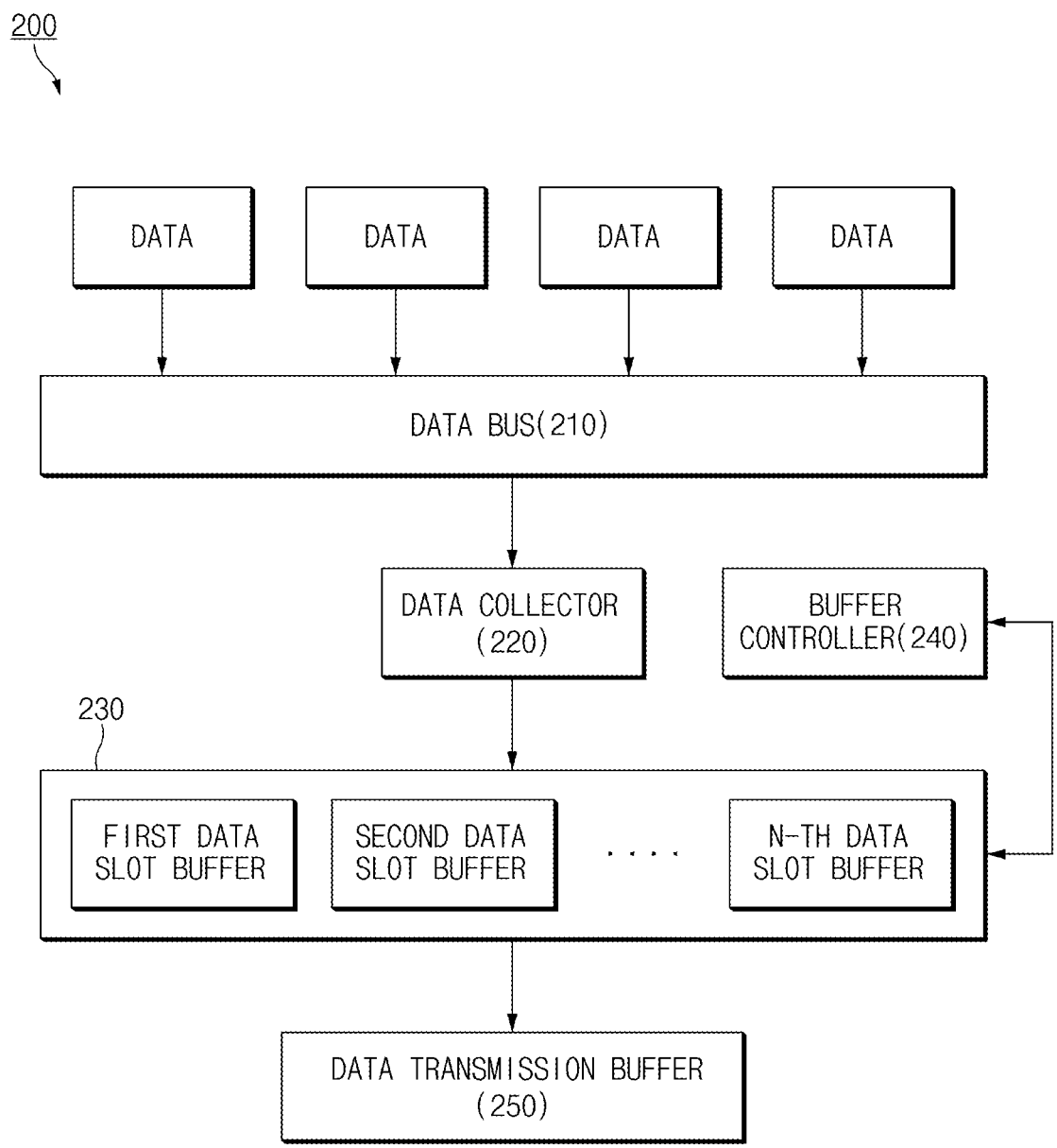
FIG. 2 is a block diagram for describing a structure of an apparatus of optimizing VCRM transmission data, according to various exemplary embodiments of the present invention.

FIG. 2 is a block diagram for describing a structure of an apparatus of optimizing VCRM transmission data, according to various exemplary embodiments of the present invention.

Hereinafter, for convenience of description, an apparatus 200 for optimizing VCRM transmission data will be briefly referred to as an "apparatus". The apparatus 200 may be provided in the vehicle to collect data from various ECUs connected to a vehicle internal communication network.

Referring to FIG. 2, the apparatus 200 may include a data bus 210, a data collector 220, a slot buffer 230, a buffer controller 240, and a data transmission buffer 250. Here, the slot buffer 230 may include first to N-th data slot buffers allocated for each data type. The number of data slot buffers may be preset depending on data type, but this is only an example. For example, the number of data slot buffers may be dynamically changed depending on collected data.

According to a preset data collection policy, the data collector 220 may perform a role of actually collecting data in a vehicle through the data bus 220.

The data collector 220 may identify a data slot buffer corresponding to the collected data, and then may deliver the corresponding data to the identified data slot buffer.

The slot buffer 230 is a temporary storage space allocated in a memory for each collection target data or data type. In the instant case, the number of data slot buffers included in the slot buffer 230 may match the number of data objects set as current collection targets. A size of each data slot buffer may have a default size when each data slot buffer is generated, and may be dynamically adjusted depending on a data collection state.

Each data slot buffer may compare data newly received from the data collector 220 with data last recorded in its own buffer and may transmit the comparison result to the buffer controller 240.

The buffer controller 240 may control overall operations of the slot buffer 230 in conjunction with data collection settings/policy, or the like. As an example, the buffer controller 240 may control the generation, change, and deletion of a data slot buffer. The buffer controller 240 may receive the data comparison result of each data slot buffer, may dynamically determine the size of the corresponding data slot buffer, and may determine whether to perform buffer flush.

For example, when the buffer flush is determined, the buffer controller 240 may transmit, to the slot buffer 230, a predetermined control signal for requesting the flush of the corresponding data slot buffer. As various exemplary embodiments of the present invention, when the buffer flush is determined, the buffer controller 240 may directly flush the corresponding data slot buffer.

The data transmission buffer 250 may tag each transmission data with information (e.g., status information of the slot buffer 230) required to use data collected in the server 5 to be transmitted.

Figure 3:
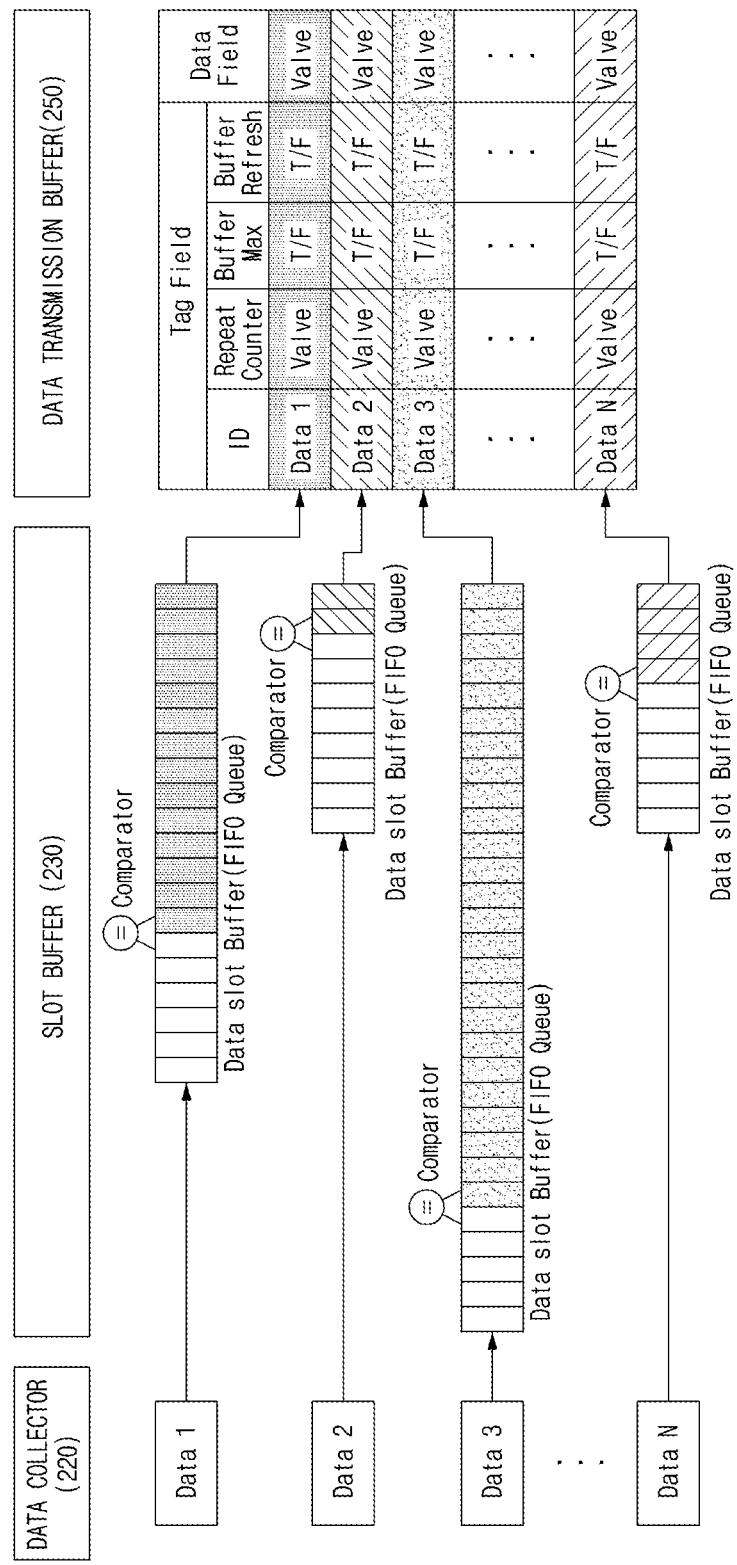
FIG. 3 is a diagram for describing a detailed operation method of the device of FIG. 2.

FIG. 3 is a diagram for describing a detailed operation method of the device of FIG. 2.

Referring to FIG. 3, a data slot buffer for each data collected inside a vehicle may be allocated.

When data collection settings are determined, data slot buffers corresponding to the number of set collection target data objects may be generated with a default size (e.g., 10 slots). In the instant case, the size of each slot may be preset for each data object when data collection is set. A unique identifier (ID) may be allocated to each data slot buffer. Each ID may be unique for each data object to be collected. Each collected data may be delivered to a data slot buffer having the same ID as the collected data.

Referring to FIG. 3, when data is collected through the data bus 210, the data collector 220 may deliver the corresponding data to the data slot buffer having the same ID as an ID allocated for each data.

When new data for each data slot buffer is entered from the data collector 220, the slot buffer 230 may operate as in the flowchart of FIG. 4 to be described later.

At the time of transmission of the collected data, the data transmission buffer 250 may transmit both a tag field and a data field in the data transmission buffer 250. Herein, the tag field may include at least one of an ID field for uniquely identifying the corresponding data, a repeat counter field indicating the number of times that the same data is repeatedly received, a buffer max field indicating whether the corresponding data slot buffer reaches the max buffer size, or a buffer refresh field indicating whether a data value received in the corresponding data slot buffer is changed.

In various exemplary embodiments of the present invention, a value of only the data indicating that the buffer refresh attribute is "True" in the tag field is changed after the previous data transmission, and thus only data indicating that a buffer refresh state value is "True" may be transmitted at the next transmission time. Furthermore, even though the buffer refresh state value has "False", data indicating that the buffer max state value is "True" may be also transmitted. When data transmission is successful, both the buffer refresh state value and the buffer max state value of the data transmission buffer 250 may be changed to "False".

In various exemplary embodiments of the present invention, the apparatus 200 may further include a device for setting a default size and a max size for the at least one data slot buffer. The buffer controller 240 may determine that the buffer max size is reached, based on an event that the data slot buffer corresponding to the new data is in a full state, and a current size of the corresponding data slot buffer reaches the max size.

In various exemplary embodiments of the present invention, the buffer controller may increase the size of the corresponding data slot buffer by the default size, based on an event that the buffer max size is not reached.

In various exemplary embodiments of the present invention, the apparatus 200 may further include a device for updating a tag field based on an event that the corresponding data slot buffer reaches a buffer max size. The apparatus 200 may include a tag field in the data to be transmitted to the server 5 to be transmitted.

In various exemplary embodiments of the present invention, the apparatus 200 may identify a data slot buffer, in which new data is to be recorded, depending on the input of new data, and may determine whether the new data is the first data of the identified data slot buffer. When the new data is not the first data, the apparatus 200 may determine whether data is changed, and may perform buffer flush on the corresponding data slot buffer based on an event that the data is changed.

In various exemplary embodiments of the present invention, the apparatus 200 may reduce the size of the corresponding data slot buffer by a predetermined default size depending on data change.

In various exemplary embodiments of the present invention, the apparatus 200 may set the default size and the max size differently for each data slot buffer when generating at least one data slot buffer.

In various exemplary embodiments of the present invention, the buffer controller 240 may determine whether data is changed, by comparing the new data with the most recently-recorded data of the data slot buffer corresponding to the new data.

Figure 4:
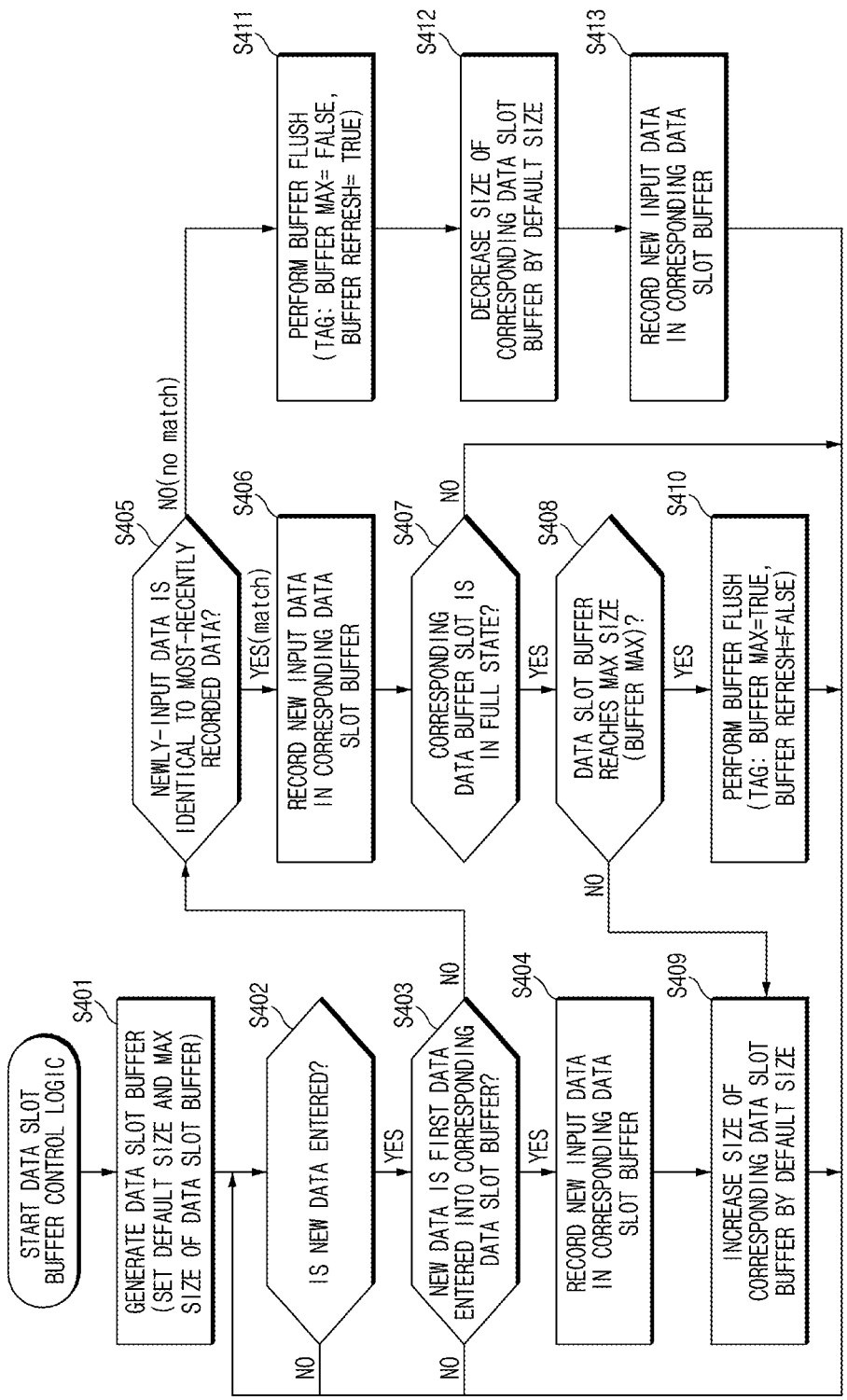
FIG. 4 is a flowchart illustrating an operating mechanism of an apparatus, according to various exemplary embodiments of the present invention.

FIG. 4 is a flowchart illustrating an operating mechanism of an apparatus, according to various exemplary embodiments of the present invention.

Referring to FIG. 4, when data slot buffer control logic is started, the apparatus 200 may generate at least one data slot buffer and may set a default size and max size of each data slot buffer (S401). At the instant time, at least one of the default size or the max size for each data slot buffer may be set identically or differently for all generated data slot buffers. For example, the default size and the max size may be set differently depending on the ID (i.e., a data type (or an attribute)) of the data slot buffer. For example, each ECU may periodically or randomly generate data of different sizes to be transmitted to the apparatus 200.

When data is entered into the corresponding data slot buffer, the apparatus 200 may determine whether the data is the first data of the corresponding data slot buffer (S402 to S403).

When the determination result indicates that the data is the first received data, the apparatus 200 may record the received data in the corresponding data slot buffer, and then may return to operation 402 to wait for entering new data (S404).

When the determination result in operation 403 indicates that the data is not the first received data, the apparatus 200 may compare whether the newly-received data value is identical to a data value most-recently recorded in the corresponding data slot buffer (S405).

When the comparison result indicates that the newly-received data value is identical to the most-recently recorded data value, the apparatus 200 may record new input data in the corresponding data slot buffer (S406).

The apparatus 200 may determine whether the corresponding data buffer slot is in a full state (S407).

When the determination result indicates that the corresponding data buffer slot is in a full state, the apparatus 200 may determine whether the corresponding data slot buffer reaches the max size set in operation 401 (S408).

When the determination result indicates that the size of the data slot buffer does not reach the max size, the apparatus 200 may increase the size of the corresponding data slot buffer by the default size (S409).

When the determination result in operation 408 indicates that the corresponding data slot buffer reaches the max size, the apparatus 200 may perform buffer flush for transmitting data recorded in the corresponding data slot buffer to the data transmission buffer 450 (S410). In the instant case, in a tag field value of the corresponding data slot buffer, "Buffer Max" may be updated to "TRUE" and "Buffer ReFresh" may be updated to "FALSE". Furthermore, when the buffer flush is performed, a value of "Repeat Counter" corresponding to the corresponding data slot buffer may be updated to the number of data currently included in the corresponding data slot buffer.

In operation 407, when the corresponding data slot buffer is not in the full state, the apparatus 200 may return to operation 402 to wait for entering new data.

When the comparison result in operation 405 indicates that the new input data is not identical to the most recently-recorded data, the apparatus 200 may perform buffer flush (S411). In the instant case, in a tag field value of the corresponding data slot buffer, "Buffer Max" may be updated to "FALSE" and "Buffer ReFresh" may be updated to "TRUE". Furthermore, when the buffer flush is performed, a value of "Repeat Counter" corresponding to the corresponding data slot buffer may be updated to the number of data currently included in the corresponding data slot buffer.

When performing the buffer flush depending on data change, the apparatus 200 may decrease the size of the corresponding data slot buffer by the default size (S412).

Afterward, the apparatus 200 may record new input data in the corresponding data slot buffer and then may return to operation 402 (S413).

In various exemplary embodiments of the present invention, when performing the buffer flush depending on "Buffer Max", the apparatus 200 may not perform a buffer size reduction operation on the corresponding data slot buffer.

The operations of the method or algorithm described in connection with the exemplary embodiments included in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may reside in a user terminal. Alternatively, the processor and storage medium may be implemented with separate components in the user terminal.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims. Therefore, embodiments of the present invention are not intended to limit the technical spirit of the present invention, but provided only for the illustrative purpose. The scope of protection of the present invention may be construed by the attached claims, and all equivalents thereof may be construed as being included within the scope of the present invention.

The present invention may provide a method for transmitting VCRM data and an apparatus therefor.

Furthermore, the present invention may effectively reduce wireless data usage by optimizing data transmission within the limited wireless communication data capacity of a VCRM terminal.

Furthermore, the present invention may effectively reduce wireless data usage by the VCRM terminal by transmitting the number of times a specific value is repeated together with data instead of repeatedly transmitting the same value collected every collection cycle, when the feature of collected data is static.

Furthermore, the present invention may be implemented only by changing software without changing hardware, and thus a cost may be effectively reduced.

Besides, a variety of effects directly or indirectly understood through the specification may be provided.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of transmitting vehicle customer relation management (VCRM) data in a vehicle terminal, the method comprising:
   generating at least one data slot buffer;
   determining whether to perform buffer flush according to whether data is changed, and whether a buffer max size is reached, when new data is entered; and
   flushing data recorded in a corresponding data slot buffer according to the determination for performing the buffer flush to be transmitted to a server over a wireless network.

2. The method of claim 1, further including:
   setting a default size and a max size for the at least one data slot buffer,
   wherein it is determined that the buffer max size is reached, according to an event that the data slot buffer corresponding to the new data among the at least one data slot buffer is in a full state and a current size of the corresponding data slot buffer reaches the max size.

3. The method of claim 2, further including:
   increasing a size of the corresponding data slot buffer by the default size according to an event that the buffer max size is not reached.

4. The method of claim 2, further including:
   updating a tag field according to an event that the buffer max size is reached,
   wherein data to be transmitted to the server includes the tag field to be transmitted.

5. The method of claim 4, wherein the tag field includes at least one of:
   an ID field for uniquely identifying a corresponding data;
   a repeat counter field indicating a number of times that same data is repeatedly received;
   a buffer max field indicating whether the corresponding data slot buffer reaches the max buffer size; or
   a buffer refresh field indicating whether a data value received in the corresponding data slot buffer is changed.

6. The method of claim 2, further including:
   identifying the data slot buffer, in which the new data is recorded, depending on an input of the new data;
   determining whether the new data is first data of the identified data slot buffer;
   determining whether to change the data when a result of the determining whether the new data is the first data of the identified data slot buffer indicates that the new data is not the first data; and
   performing the buffer flush based on an event that the data is changed.

7. The method of claim 6, further including:
decreasing a size of the identified data slot buffer by the default size according to the event that the data is changed; and
recording the new data in the identified data slot buffer.

8. The method of claim 2, wherein the default size and the max size are differently set for each of the at least one data slot buffer.

9. The method of claim 1, wherein it is determined whether the data is changed, by comparing the new data with data which is most recently recorded in a data slot buffer corresponding to the new data, among the at least one data buffer.

10. The method of claim 1,
wherein the new data is received through a vehicle internal communication network, and
wherein the vehicle internal communication network includes at least one of a controller area network (CAN), Ethernet, a local interconnect network (LIN), or FlexRay.

11. An apparatus provided in a vehicle and controlling vehicle customer relation management (VCRM) data transmission, the apparatus comprising:
a data collector configured to collect data over a vehicle internal communication network;
a buffer controller configured to generate at least one data slot buffer corresponding to the data and to determine whether to perform buffer flush on the at least one data slot buffer according to whether to change the data and whether a buffer max size is reached, when new data is received from the data collector; and
a data transmission buffer configured to flush data recorded in a corresponding data slot buffer according to the determination for performing the buffer flush to be transmitted to a server over a wireless network.

12. The apparatus of claim 11, further including:
a device configured to set a default size and a max size for the at least one data slot buffer,
wherein the buffer controller is configured to determine that the buffer max size is reached, according to an event that the data slot buffer corresponding to the new data among the at least one data slot buffer is in a full state, and a current size of the corresponding data slot buffer reaches the buffer max size.

13. The apparatus of claim 12, wherein the buffer controller is configured to increase a size of the corresponding data slot buffer by the default size according to an event that the buffer max size is not reached.

14. The apparatus of claim 12, further including:
a device configured to update a tag field according to an event that the buffer max size is reached,
wherein data to be transmitted to the server includes the tag field to be transmitted.

15. The apparatus of claim 14, wherein the tag field includes at least one of:
an ID field for uniquely identifying corresponding data;
a repeat counter field indicating a number of times that same data is repeatedly received;
a buffer max field indicating whether the corresponding data slot buffer reaches the max buffer size; or
a buffer refresh field indicating whether data value received in the corresponding data slot buffer is changed.

16. The apparatus of claim 12, further including:
a device configured to identify the data slot buffer, in which the new data is recorded, depending on an input of the new data;
a device configured to determine whether the new data is first data of the identified data slot buffer;
a device configured to determine whether to change the data when a result of the determining whether the new data is the first data of the identified data slot buffer indicates that the new data is not the first data; and
a device configured to perform the buffer flush based on an event that the data is changed.

17. The apparatus of claim 16, further including:
a device configured to decrease a size of the identified data slot buffer by the default size according to the event that the data is changed; and
a device configured to record the new data in the identified data slot buffer.

18. The apparatus of claim 12, wherein the default size and the max size are differently set for each of the at least one data slot buffer.

19. The apparatus of claim 11, wherein the buffer controller is configured to determine whether the data is changed, by comparing the new data with data which is most recently recorded in a data slot buffer corresponding to the new data, among the at least one data buffer.

20. The apparatus of claim 11, wherein the new data is received through the vehicle internal communication network, and
wherein the vehicle internal communication network includes at least one of CAN, Ethernet, LIN, or FlexRay.

* * * * *